(12) United States Patent
Ohtani

(10) Patent No.: US 6,981,487 B2
(45) Date of Patent: Jan. 3, 2006

(54) KNOCKING DETERMINATION APPARATUS FOR INTERNAL COMBUSTION ENGINE

(75) Inventor: Motoki Ohtani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/982,854

(22) Filed: Nov. 8, 2004

(65) Prior Publication Data
US 2005/0098156 A1    May 12, 2005

(30) Foreign Application Priority Data
Nov. 12, 2003  (JP)  ............... 2003-382842

(51) Int. Cl.
*F02P 5/00*  (2006.01)
(52) U.S. Cl. .................. 123/406.37; 123/299
(58) Field of Classification Search ......... 123/299, 123/300, 431, 446, 510, 406.37, 406.45, 123/406.47, 406.29, 406.21
See application file for complete search history.

(56) References Cited

U.S. PATENT DOCUMENTS

| | | | | |
|---|---|---|---|---|
| 5,832,880 A | * | 11/1998 | Dickey | ............ 123/25 C |
| 5,875,743 A | * | 3/1999 | Dickey | ............ 123/25 C |
| 6,659,071 B2 | * | 12/2003 | LaPointe et al. | ............ 123/299 |
| 6,675,748 B2 | * | 1/2004 | Ancimer et al. | ............ 123/27 R |
| 6,684,852 B2 | * | 2/2004 | Wright et al. | ............ 123/431 |

FOREIGN PATENT DOCUMENTS

| | | |
|---|---|---|
| JP | 05141334 | 6/1993 |
| JP | 07-091353 | 4/1995 |
| JP | 07-103048 | 4/1995 |
| JP | 10-159642 | 6/1998 |

* cited by examiner

*Primary Examiner*—Mahmoud Gimie
(74) *Attorney, Agent, or Firm*—Kenyon & Kenyon

(57) ABSTRACT

An electronic control for determining knocking in an internal combustion engine having an intake injector for injecting fuel into an air intake port and an in-cylinder injector for directly injecting fuel into a combustion chamber. Knocking is determined based on an output signal from a knock sensor during a knock determination period. The electronic control unit alters the knock determination period in accordance with the ratio of the amount of fuel injected by the two injectors.

18 Claims, 8 Drawing Sheets

KNOCKING DETERMINATION APPARATUS FOR INTERNAL COMBUSTION ENGINE

CROSS-REFERENCE TO RELATED APPLICATIONS

This application is based upon and claims the benefit of priority from prior Japanese-Patent Application No. 2003-382842, filed on Nov. 12, 2003, the entire contents of which are incorporated herein by reference.

BACKGROUND OF THE INVENTION

The present invention relates to a knocking determination apparatus for an internal combustion engine having an intake injector for injecting fuel into an intake system and an in-cylinder injector for injecting fuel into a combustion chamber.

An internal combustion engine having two different types of injectors for separately injecting fuel into an intake system, such as an air intake port, and a combustion chamber is known in the prior art (refer to Japanese Laid-Open Patent Publication 7-103048).

This type of internal combustion engine improves fuel consumption and ensures appropriate engine output by switching fuel injection modes with the two types of injectors in accordance with the engine operating conditions.

A typical internal combustion engine performs knocking control, which includes a knocking determination process for determining whether or not knocking has occurred and a process for adjusting ignition timing or the like in accordance with the result of the determination. The knocking determination process determines whether or not knocking has occurred according to a detection signal from a knock sensor that detects vibration of the cylinder block, particularly, vibration of cylinders after ignition.

In a conventional internal combustion engine, fuel injection into a combustion chamber is more apt to cause uneven fuel distribution in the combustion chamber compared to fuel injection into an intake system. When an air-fuel mixture containing unevenly distributed fuel is ignited, part of the air-fuel mixture where the fuel concentration is high burns rapidly. This increases the combustion rate of the air-fuel mixture. Thus, knocking occurs in different manners depending on whether fuel is injected by the in-cylinder injector or intake injector. For example, the timing when knocking occurs and the level of engine vibration caused by the knocking differs between in-cylinder injector fuel injection and intake injector fuel injection. Therefore, an internal combustion engine having such two types of injectors often exhibits low reliability in the determination of knocking.

SUMMARY OF THE INVENTION

One aspect of the present invention is an apparatus for determining whether or not knocking has occurred in an internal combustion engine. The internal combustion engine includes a first injector for directly injecting fuel into a combustion chamber, a second injector for injecting fuel into an intake system, and a knock sensor for detecting information relating to knocking and generating an output signal. The apparatus includes a knocking determination means for determining whether or not knocking has occurred based on the output signal of the knock sensor during a knock determination period. An altering means alters the knock determination period in accordance with a ratio between the amount of fuel the first injector injects relative and the amount of fuel the second injector injects.

Another aspect of the present invention is an apparatus for determining whether or not knocking has occurred in an internal combustion engine. The internal combustion engine includes a first injector for directly injecting fuel into a combustion chamber, a second injector for injecting fuel into an intake system, and a knock sensor for detecting information relating to knocking and generating an output signal. The apparatus includes a knocking determination means for comparing the output signal of the knock sensor with a knock determination level to determine whether or not knocking has occurred. A changing means changes the knock determination level in accordance with a ratio between the amount of fuel the first injector injects and the amount of fuel the second injector injects.

A further aspect of the present invention is an apparatus for determining whether or not knocking has occurred in an internal combustion engine. The internal combustion engine includes a first injector for directly injecting fuel into a combustion chamber, a second injector for injecting fuel into an intake system, and a knock sensor for detecting information relating to knocking and generating an output signal. The apparatus includes a controller for determining whether or not knocking has occurred based on the output signal of the knock sensor during a knock determination period and for altering the knock determination period in accordance with a ratio between the amount of fuel the first injector injects and the amount of fuel the second injector injects.

A further aspect of the present invention is an apparatus for determining whether or not knocking has occurred in an internal combustion engine. The internal combustion engine including a first injector for directly injecting fuel into a combustion chamber, a second injector for injecting fuel into an intake system, and a knock sensor for detecting information relating to knocking and generating an output signal. The apparatus includes a controller for comparing the output signal of the knock sensor with a knock determination level to determine whether or not knocking has occurred and for changing the knock determination level in accordance with a ratio between the amount of fuel the first injector injects and the amount of fuel the second injector injects.

A further aspect of the present invention is a method for preventing knocking in an internal combustion engine. The internal combustion engine includes a first injector for directly injecting fuel into a combustion chamber, a second injector for injecting fuel into an intake system, and a spark plug. The method includes measuring vibration of the internal combustion engine to generate a detection signal representing the vibration, adjusting a knock determination period in accordance with the ratio between the amount of fuel the first injector injects and the amount of fuel the second injector injects, adjusting a knock determination level in accordance with said ratio, sensing knocking in the internal combustion engine using a knock sensor that generates an output signal representative of knocking, comparing the output signal of the knock sensor during the knock determination period that has been adjusted with the knock determination level that has been adjusted to determine whether or not knocking has occurred, and adjusting the timing for spark plug ignition when knocking has occurred.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A knocking determination apparatus applied to an internal combustion engine according to a first embodiment of the present invention will now be described.

Figure 1:
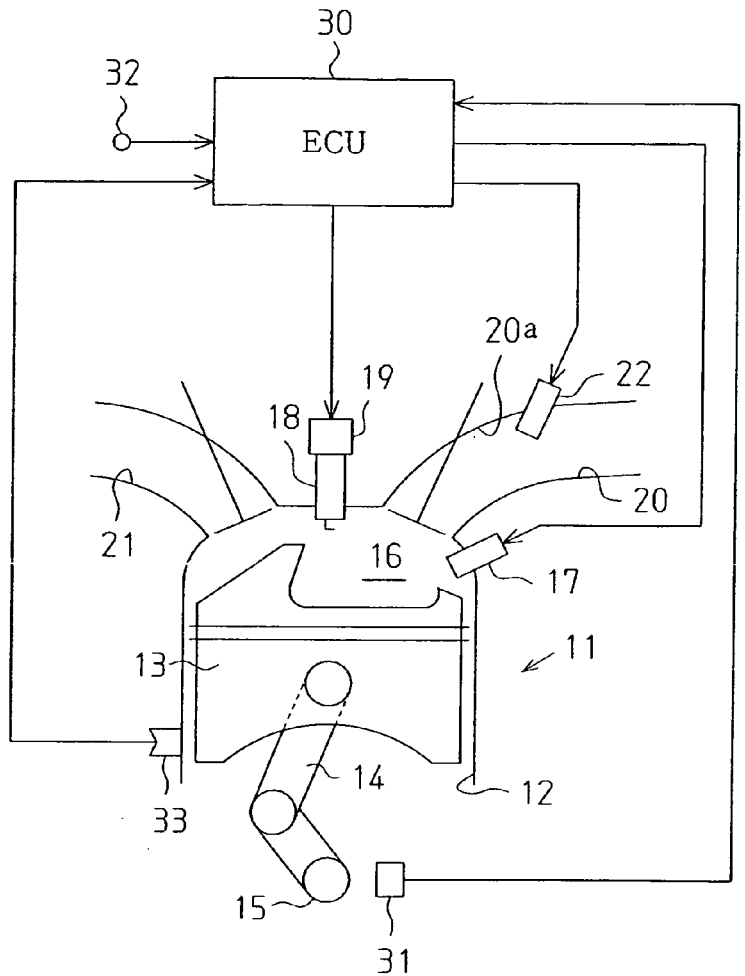
FIG. 1 is a schematic view of an internal combustion engine provided with a knocking determination apparatus according to a first embodiment of the present invention.

FIG. 1 schematically shows an internal combustion engine 11. The internal combustion engine 11 is a four-cycle internal combustion engine having a plurality of cylinders 12 (only one shown in FIG. 1). A piston 13 reciprocates in each of the cylinders 12. The piston 13 is linked to a crankshaft 15, which functions as an output shaft for the internal combustion engine 11, by a connecting rod 14. The connecting rod 14 converts reciprocation of the piston 13 to rotation of the crankshaft 15.

A combustion chamber 16 is defined above the piston 13 in each of the cylinders 12. An injector (in-cylinder injector 17) is attached to each cylinder 12 to directly inject fuel into the associated combustion chamber 16. The in-cylinder injector 17 is supplied with high-pressure fuel by a fuel supply mechanism (not shown). Fuel is directly supplied into the combustion chamber 16 by opening the in-cylinder injector 17.

A spark plug 18 is attached to each of the cylinders 12 to ignite a mixture of fuel and air supplied to the combustion chamber 16. An igniter 19 is connected to the spark plug 18 for adjusting the ignition timing of the spark plug 18.

Each of the combustion chambers 16 communicates with an intake passage 20 and an exhaust passage 21. An air intake port 20a, which defines the boundary between the combustion chamber 16 and the intake passage 20, is provided with an injector (intake injector 22) for injecting fuel into the intake port 20a. The intake injector 22 is supplied with fuel having a predetermined pressure through a fuel supply mechanism (not shown). The predetermined pressure is lower than the pressure of fuel supplied to the in-cylinder injector 17. Fuel is supplied to the intake port 20a by opening the intake injector 22.

A throttle valve is arranged in the intake passage 20 for adjusting the amount of air drawn into the combustion chamber 16. The intake passage 20 and the intake port 20a form part of the intake system of the internal combustion engine 11.

An electronic control unit (ECU) 30 controls the internal combustion engine 11. The electronic control unit 30 includes a central processing unit (CPU) for conducting various engine control processes, a memory for storing control programs and information required for the engine control, drive circuits for the in-cylinder injectors 17 and intake injectors 22, and a drive circuit for the igniter 19.

The electronic control unit 30 is connected to various sensors for detecting the engine operating conditions. For example, a crank sensor 31 detects the rotational angle of the crankshaft 15 serving as the engine output shaft. That is, the crank sensor 31 detects the engine speed NE. An accelerator sensor 32 detects the accelerator manipulation amount ACCP (depression amount of the accelerator pedal). A knock sensor 33 provided in the cylinder block detects vibration transmitted from the combustion chamber 16 from each cylinder 12 to the cylinder block. An air flow meter and a coolant temperature sensor respectively detect the amount of intake air and the temperature of the engine coolant (not shown).

Detection signals from these sensors are provided to the electronic control unit 30. The electronic control unit 30, which detects the operating condition of the internal combustion engine 11 based on the detection signals from the sensors, conducts various engine control processes including fuel injection control and ignition timing control in accordance with the operating conditions.

The fuel injection control of the internal combustion engine 11 performed by the electronic control unit 30 will now be described.

First, fuel injection control for the first embodiment will be described with reference to FIG. 2. The electronic control unit 30 determines, in accordance with the engine speed NE and the engine load L of the internal combustion engine 11, whether to use the in-cylinder injectors 17 or the intake injectors 22 or whether to use both injectors 17 and 22. The engine load L of the internal combustion engine 11 is determined from, for example, the intake air amount per rotation of the internal combustion engine 11.

Figure 2:
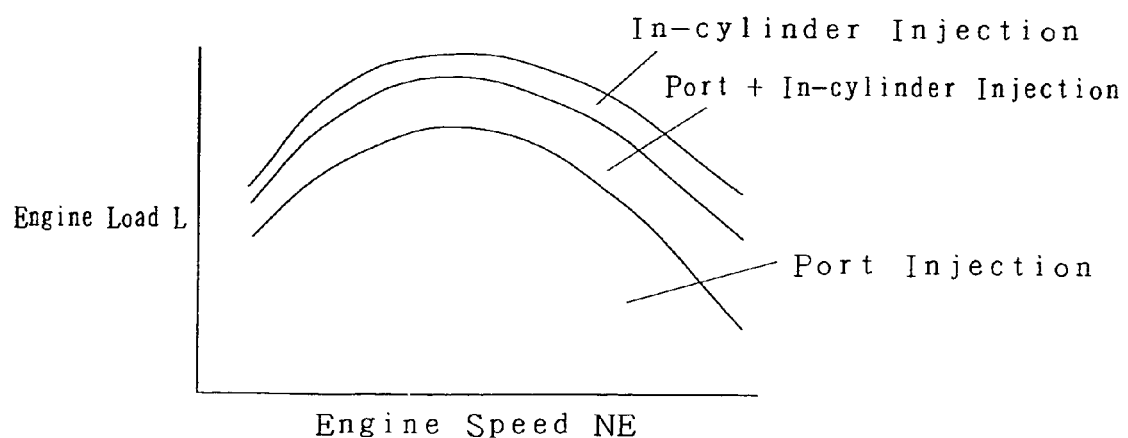
FIG. 2 is a map showing the relationship between the operating condition of the internal combustion engine and the fuel injection modes.

As shown in FIG. 2, for every engine speed NE, when the throttle valve is fully opened or substantially fully opened and the intake air amount is relatively large (i.e., when the engine load L is relatively large), an in-cylinder injection mode is selected as the fuel injection mode. In the in-cylinder injection mode of the first embodiment, fuel is injected into the combustion chambers 16 only from the in-cylinder injector 17 during the intake stroke. In this case, the air-fuel mixture basically undergoes homogeneous combustion.

For every engine speed NE, when the open degree of the throttle valve becomes intermediate from a totally closed state and the intake air amount is relatively small (i.e., when the engine load L is between a low range and an intermediate range), a port injection mode is selected as the fuel injection mode. In the port injection mode, fuel is supplied to the combustion chambers 16 only from the intake injector 22.

Further, for every engine speed NE, when the open degree of the throttle valve is greater than the intermediate degree but less than the substantially fully open state (i.e., when the engine load L is between an intermediate range and a high range), combined port and in-cylinder injection is selected as the fuel injection mode. In the combined port and in-cylinder injection mode, fuel is supplied from both the in-cylinder injector 17 and the intake injector 22.

By changing the fuel injection mode in accordance with the engine operating conditions in this manner, the air-fuel mixture becomes homogeneous and the output of the internal combustion engine 11 is improved in the high load range. In other words, the air-fuel mixture becomes more homogeneous when using the intake injector 22 compared to when using the in-cylinder injector 17. Therefore, in the low to intermediate load ranges, the intake injector 22 is used to obtain a homogeneous air-fuel mixture. When using the in-cylinder injector 17 to inject fuel, the temperature of the air-fuel mixture tends to decrease more easily due to latent heat of vaporization than when using the intake injector 22 to inject fuel. Therefore, in the high load range, the in-cylinder injector 17 is used to enhance the charging efficiency of intake air and to improve the engine output.

Figure 3:
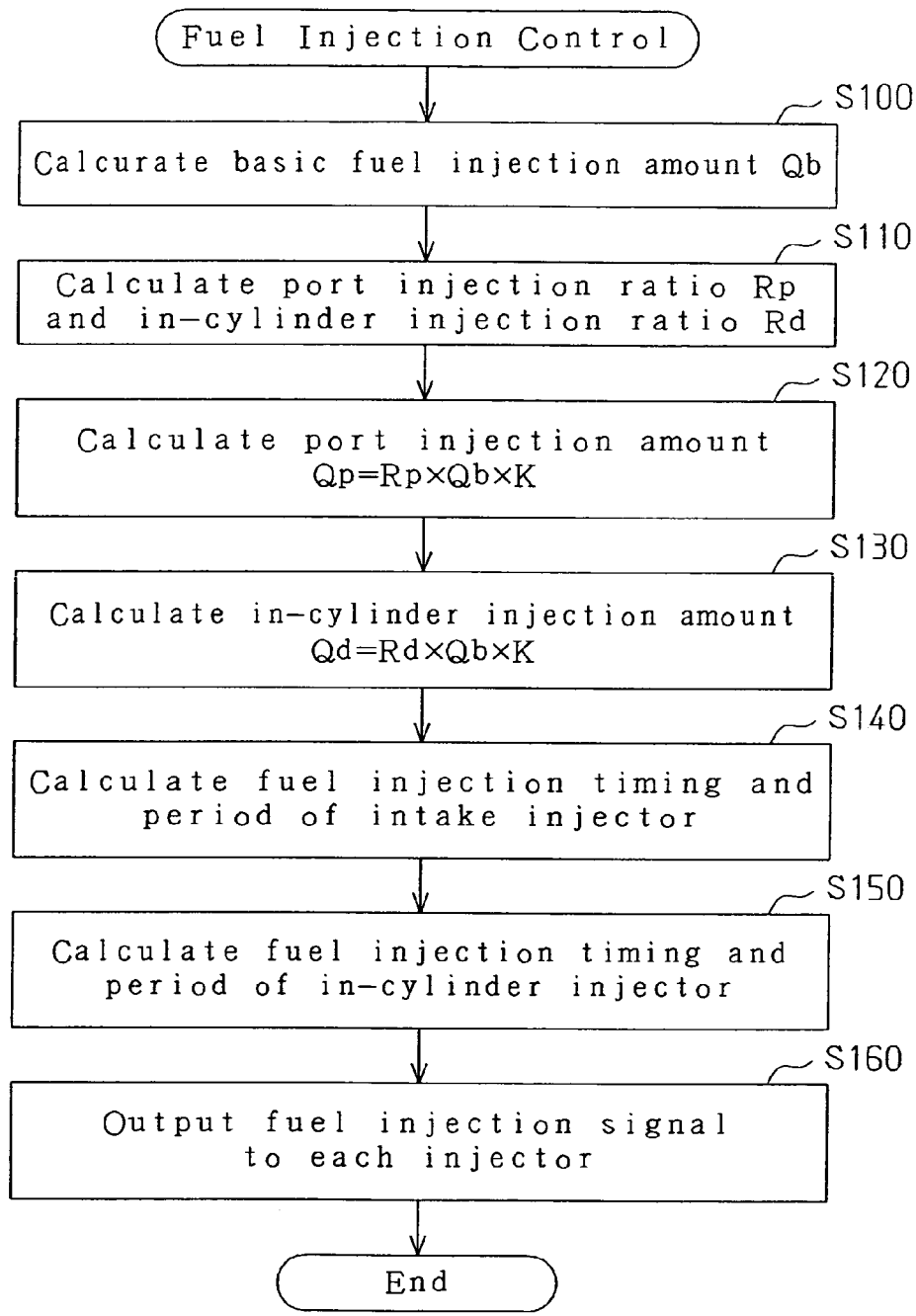
FIG. 3 is a flowchart showing a fuel injection control process.

Next, the procedures for processing the fuel injection control according to the first embodiment will be described with reference to the flowchart of FIG. 3. The process shown in FIG. 3 is repeated in predetermined cycles.

First, in step S100, the electronic control unit 30 calculates a basic fuel injection amount Qb based on the engine load L obtained from the accelerator manipulation amount ACCP, the intake air amount, and the engine speed NE. In this embodiment, the electronic control unit 30 calculates the basic fuel injection amount Q by referring to an injection amount calculation map stored in the memory.

In step S110, the electronic control unit 30 determines the ratio between the fuel injected into the combustion chambers 16 from the intake injector 22 and the fuel injected from the in-cylinder injector 17. More specifically, the electronic control unit 30 determines an in-cylinder injection ratio Rd of the fuel injected from the injector 17 and a port injection ratio Rp of the fuel injected from the intake injector 22 in accordance with the engine operating condition. For example, in the port injection mode shown in FIG. 2, the ratio Rp is one and the ratio Rd is zero. In the in-cylinder injection mode, the ratio Rp is zero and the ratio Rd is 1. In the combined port and in-cylinder injection mode, the ratio Rp and Rd are variably set in a range satisfying the conditions of "0<Rp<1, 0<Rd<1, and Rp+Rd=1."

In step S120, the electronic control unit 30 calculates then amount of fuel injected from the intake injector 22 (final port fuel injection amount Qp), using the following expression (1), based on the port injection ratio Rp and the basic fuel injection amount Qb. A correction coefficient K is set based on the coolant temperature and air-fuel ratio control of the internal combustion engine 11.

$$Qp=Rp \times Qb \times K \tag{1}$$

In step S130, the electronic control unit 30 calculates the amount of fuel injected from the in-cylinder injector 17 (final in-cylinder injection amount Qd), using the following expression (2), based on the in-cylinder injection ratio Rd and the basic fuel injection amount Qb. The correction coefficient K is set based on the coolant temperature and the air-fuel ratio control of the internal combustion engine 11.

$$Qd=Rd \times Qb \times K \tag{2}$$

As is obvious from expression (2), the amount of fuel injected by the in-cylinder injector 17 is increased as the in-cylinder injection ratio Rd becomes larger.

In step S140, the electronic control unit 30 calculates the timing for injecting fuel from the intake injector 22 based on the engine speed NE, the engine load L, and so on. The fuel injection timing is represented by a crank angle corresponding to the timing when an intake injector 22 starts fuel injection and the compression top dead center of the associated cylinder. The electronic control unit 30 also calculates the time period (crank angle) required for the intake injector 22 to inject the final port fuel injection amount Qp of fuel based on the final port fuel injection amount Qp and the engine speed NE. The electronic control unit 30 calculates the fuel injection timing and the injection period by referring to injection timing and injection period calculation maps stored in the memory.

In step S150, the electronic control unit 30 calculates the timing for injecting fuel from the in-cylinder injector 17 based on the engine speed NE, the engine load L, and so on. The fuel injection timing is represented by a crank angle corresponding to the timing when an in-cylinder injector 17 starts fuel injection and the compression top dead center of the associated cylinder. The electronic control unit 30 also calculates the time period (crank angle) required for the in-cylinder injector 17 to inject the final direct fuel injection amount Qd of fuel based on the final fuel in-cylinder injection amount Qd and the engine speed NE. The electronic control unit 30 also calculates the fuel injection timing and the injection period by referring to the injection timing and injection period calculation maps stored in the memory.

In step S160, the electronic control unit 30 generates a fuel injection signal for each cylinder based on the fuel injection timing and the fuel injection period obtained for each injector, and provides the fuel injection signal corresponding to each cylinder to the associated intake injector 22 and in-cylinder injector 17. The fuel injection signal is active (high level) only for the fuel injection period from the fuel injection timing.

When the fuel injection signal becomes active, an electromagnetic solenoid of the intake injector 22 or the in-cylinder injector 17 is excited. This generates an electromagnetic attraction force that separates a nozzle needle from a valve seat. As a result, the injection hole of the intake injector 22 or the in-cylinder injector 17 opens to start fuel injection. When the fuel injection signal becomes inactive, the electromagnetic solenoid is de-excited so that the nozzle needle engages the valve seat. As a result, the injection hole is closed to stop fuel injection.

Fuel is injected from the intake injector 22 or the in-cylinder injector 17 during the period when the fuel injection signal is active. This injects an appropriate amount of fuel into the combustion chambers 16 at an appropriate timing that is in accordance with the engine operating conditions.

Next, the ignition timing control for the internal combustion engine 11 executed by the electronic control unit 30 will be described.

The electronic control unit 30 performs knock determination to determine whether or not knocking has occurred in the cylinders based on the detection result of the knock sensor 33. Then, the electronic control unit 30 performs knock control to adjust the ignition timing based on the result of the knock determination.

More specifically, if it is determined that knocking has occurred, the electronic control unit 30 retards the final ignition timing AOP by a predetermined amount. In contrast, if it is determined that no knocking has occurred, the electronic control unit 30 gradually advances the final ignition timing AOP. The final ignition timing AOP is the timing for ignition in each cylinder and is represented by a crank angle (BTDC) based on the compression top dead center of each cylinder. The final ignition timing AOP is calculated by using the following expression (3).

$$AOP = ABASE - (AKMAX - AGKNK + AKCS) \quad (3)$$

In expression (3), AOP represents the final ignition timing, ABASE represents the basic ignition timing, AKMAX represents the maximum retardation amount, AGKNK represents the knocking learned amount, and AKCS represents the feedback correction amount.

In expression (3), the basic ignition timing ABASE is the ignition timing at which the maximum engine output is obtained under the condition that no knocking occurs. The maximum retardation amount AKMAX is a correction amount for correcting the basic ignition timing ABASE to a retarded timing at which knocking is prevented. The basic ignition timing ABASE and the maximum retardation amount AKMAX are set based on the engine operating conditions including the engine speed NE and the engine load L.

In expression (3), the feedback correction amount AKCS and the knocking learned amount AGKNK are correction amounts for retarding the final ignition timing AOP to suppress knocking when knocking occurs and are varied in accordance with whether or not knocking has occurred.

When knocking has occurred, the feedback correction amount AKCS is varied to shift the final ignition timing AOP to the retard angle side. If no knocking has occurred, the feedback correction amount AKCS is varied to shift the final ignition timing AOP to the advance angle side.

The knocking learned amount AGKNK is varied so that the feedback correction amount AKCS is converged into a predetermined range. If the feedback correction amount AKCS is deviated from the above-mentioned predetermined range to the side for retarding the final ignition timing AOP, then the knocking learned amount AGKNK is changed to shift the final ignition timing AOP to the retard angle side. If the feedback correction amount AKCS is deviated from the above-mentioned predetermined range to the side for advancing the final ignition timing AOP, then the knocking learned amount AGKNK is changed to shift the final ignition timing AOP to the advance angle side. Further, the electronic control unit 30 holds the knocking learned amount AGKNK.

The electronic control unit 30 provides the igniter 19 of each cylinder with an ignition signal that becomes active at the final ignition timing AOP. Thus, the spark plug 18 is ignited at an ignition timing adjusted to the vicinity of the limit where knocking occurs.

Next, the knock determination process will be described with reference to FIG. 4. The knock determination process starts when the knock control starting conditions are satisfied after the engine is started.

First, in step S400, the electronic control unit 30 sets activation and inactivation timings for a gate signal. The gate signal is a signal that determines the period for sampling the output signal from the knock sensor 33 to perform knock determination. The electronic control unit 30 refers to the output signal from the knock sensor 33 during the period the gate signal is active to perform knock determination. The period the gate signal is active is the knock determination period, and the activation and inactivation timings of the gate signal are represented by a crank angle (ATDC) based on the compression top dead center in each cylinder.

The electronic control unit 30 sets the activation and inactivation timings of the gate signal by referring to a determination period calculation map stored in the memory. The determination period calculation map is a two-dimensional map of the engine speed NE and the engine load L. The setting of the determination period calculation map will be described later.

Figure 5:
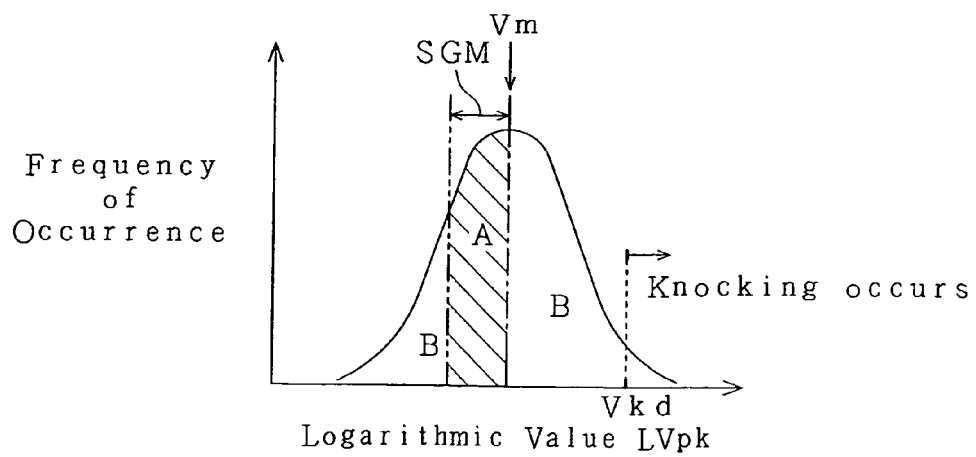
FIG. 5 is a graph showing distribution of parameters set in the knock determination process.

After setting the knock determination period, the electronic control unit 30 carries out knock determination for each of the cylinders in steps S410 to S460. In the first embodiment, the electronic control unit 30 performs the knock determination based on a peak hold value VKPEAK (maximum value) of the output signal provided by the knock sensor 33 during the knock determination period (sampling period). The knock determination is performed based on the premise that logarithmic values LVPK of the peak hold values VKPEAK exhibit normal distribution as shown in FIG. 5. The electronic control unit 30 determines whether or not knocking has occurred based on the position of the logarithmic values LVPK of the peak hold value VKPEAK for the presently sampled output signal in the normal distribution.

When the gate signal is active and the gate for knock determination is open (YES in step S410), peak hold is started for the output signal from the knock sensor 33 of the cylinder subject to knock determination (step S420). More specifically, the output signal from the knock sensor 33 is monitored after the gate signal is activated to hold the maximum value (peak hold value VKPEAK) of the output signal.

When the gate signal is inactivated and the gate is closed (YES in step S430), the peak hold value VKPEAK at that point of time, that is, the maximum value of the output signal from the knock sensor 33 in the knock determination period is read by the electronic control unit 30 (step S440).

The knock determination level is updated based on the peak hold value VKPEAK (step S450). The updating of the knock determination level will now be described.

First, parameters representing the distribution of the logarithmic value LVpk of the presently sampled peak hold value VKPEAK, for example, a median value Vm and a standard deviation value SGM shown in FIG. 5, are updated. This update is performed according to expressions (4) through (7). The updated distribution median value Vm and the standard deviation value SGM are roughly obtained by increasing or decreasing the values of the distribution median value Vm and the standard deviation value SGM prior to the update based on the comparison with the logarithmic value LVpk of the presently sampled peak hold value VKPEAK.

$$(LVpk > Vm) \quad Vm \leftarrow Vm = \Delta M \quad (4)$$

$$(LVpk \leq Vm) \quad Vm \leftarrow Vm - \Delta M \quad (5)$$

(Vm−SGM<LVpk<Vm, i.e., LVpk is within range A shown in FIG. 5)

$$SGM \leftarrow SGM - 2 \cdot \Delta S \quad (6)$$

(LVpk≦Vm−SGM or LVpk≧Vm, i.e. LVpk is within ranges B shown in FIG. 5)

$$SGM \leftarrow SGM + \Delta S \quad (7)$$

The update amount ΔM for the distribution median value Vm is a value obtained by dividing the difference between the presently sampled logarithmic value LVpk and the distribution median value Vm prior to the update by a predetermined value n1 (e.g., four). The update amount ΔS for the standard deviation value SGM is a value obtained by dividing the update amount ΔM for the distribution median value Vm by a predetermined value n2 (e.g., eight).

The knock determination level Vkd is obtained using expression (8) based on the distribution median value Vm and the updated standard deviation value SGM.

$$Vkd = Vm + u \times SGM \tag{8}$$

Value u is variably set according to the engine speed NE. Basically, value u becomes larger as the combustion pressure of air-fuel mixture within the combustion chamber 16 becomes higher.

It is determined whether or not knocking has occurred in the internal combustion engine 11 by comparing the knock determination level Vkd and the logarithmic value LVpk (step S460). More specifically, if the logarithmic value LVpk is smaller than the knock determination level Vkd, it is determined that knocking has occurred in the internal combustion engine 11. Conversely, if the logarithmic value LVpk is greater than or equal to the knock determination level Vkd, it is determined that no knocking has occurred in the internal combustion engine 11.

The setting of the knock determination period in the first embodiment will now be described.

In the first embodiment, the ratio of fuel injected from the in-cylinder injector 17 and the fuel injected from the intake injector 22 are varied according to the engine operating condition. When fuel is injected from the in-cylinder injector 17, the fuel distribution in the combustion chamber 16 tends to more become biased than when fuel is injected from the intake injector 22. If the air-fuel mixture is ignited in such a state in which the fuel is not distributed homogeneously, part of the air-fuel mixture where the fuel concentration is higher burns rapidly. This increases the combustion rate of the air-fuel mixture. Consequently, the combustion rate of the air-fuel mixture would differ between fuel injection from the in-cylinder injector 17 and fuel injection from the intake injector 22, and the timing when knocking occurs would change accordingly. Accordingly, in the first embodiment, the knock determination period is varied according to the timing in which knocking would occur due to changes in the ratio of the fuel injected from the injector.

Figure 6:
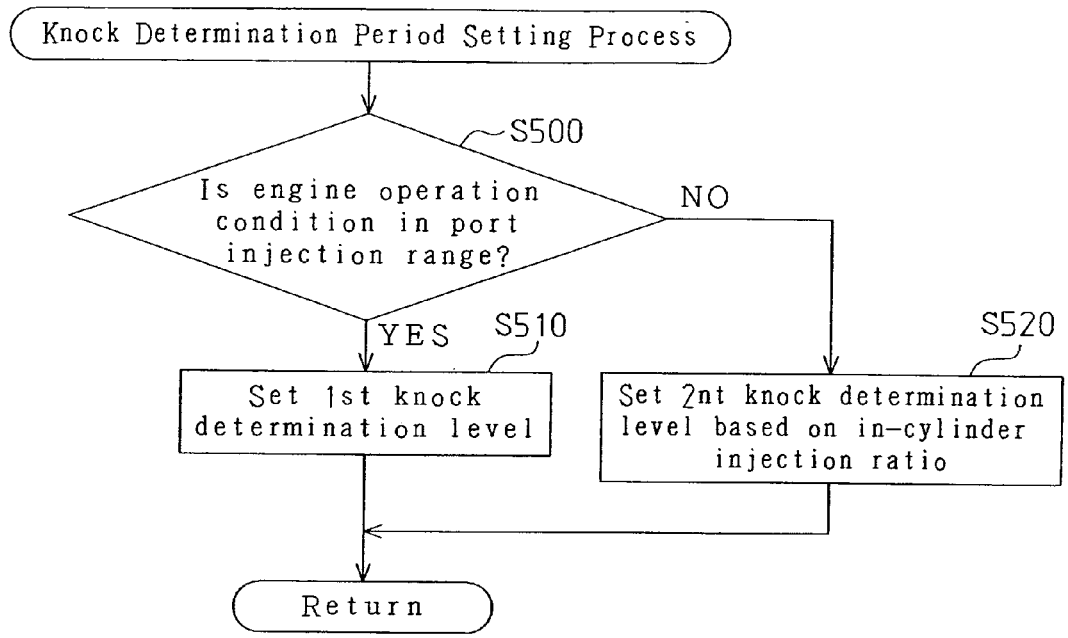
FIG. 6 is a flowchart showing a process for determining a knock determination period.

FIG. 6 shows the process for setting a knock determination period in the first embodiment. This process may also be referred to as a determination period altering process. The electronic control unit 30 functions as a determination period altering means.

Upon the start of this process, it is determined whether or not the present engine operating condition falls in the range corresponding to the port injection mode as shown in FIG. 2. In other words, it is determined whether or not fuel is injected only from the intake injector 22 (step S500). If it is determined that the current engine operating condition falls in the range corresponding to the port injection mode (YES in step S500), a first knock determination period Tkdp is set (step S510). In this case, the activation and inactivation timings of the gate signal are set based on the engine speed NE and the engine load L by referring to a first determination period calculation map stored in the memory of the electronic control unit 30.

If it is determined that the current engine operating condition does not fall in the range corresponding to the port injection mode (NO in step S500), the current engine operating condition falls in the range that does not correspond to the combined port and in-cylinder injection mode or the in-cylinder injection mode, and fuel is injected from the in-cylinder injector 17.

Figure 7:
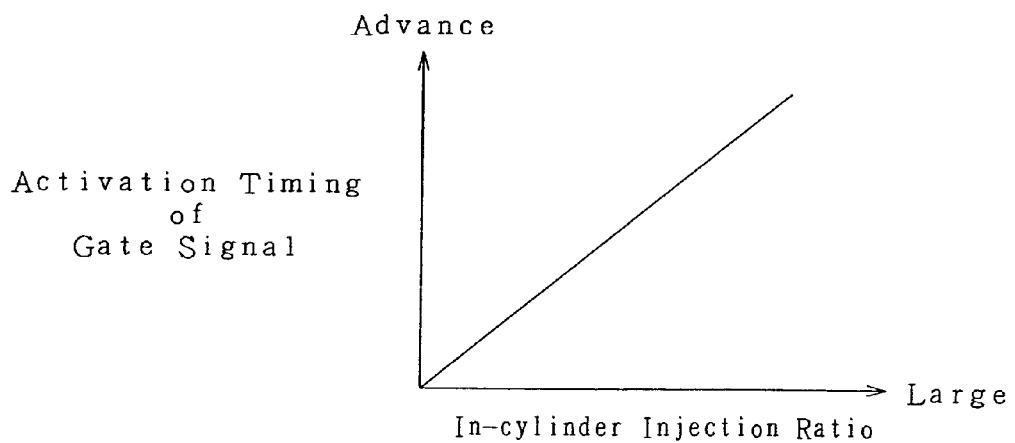
FIG. 7 is a graph showing the relationship between an in-cylinder injection ratio and an activation timing for a gate signal.

As the amount of fuel directly injected into the combustion chamber 16 increases, the combustion rate of the air-fuel mixture tends to increase. Therefore, as the ratio of the amount of fuel injected by the in-cylinder injector 17 increases, the combustion rate of the air-fuel mixture becomes higher and knocking tends to occur at an earlier timing. Accordingly, if the determination of step S500 is negative, a second knock determination period Tkdd is set based on the in-cylinder injection ratio Rd (step S520). After the activating and inactivating timings of the gate signal are set based on the engine speed NE and the engine load L by referring to a first determination period setting map (a first knock determination period Tkdp is obtained), the activation timing of the gate signal is altered, and this is set as the second knock determination period Tkdd. More specifically, the activation timing is set such that it is earlier than when the port injection mode is performed. In other words, the activation timing is advanced. As shown in FIG. 7, as the in-cylinder injection ratio Rd becomes larger, the activation timing is advanced.

In this manner, the knock determination period is altered in correspondence with the change in the knocking initiation timing caused by the difference in the fuel injection modes.

Figure 8:
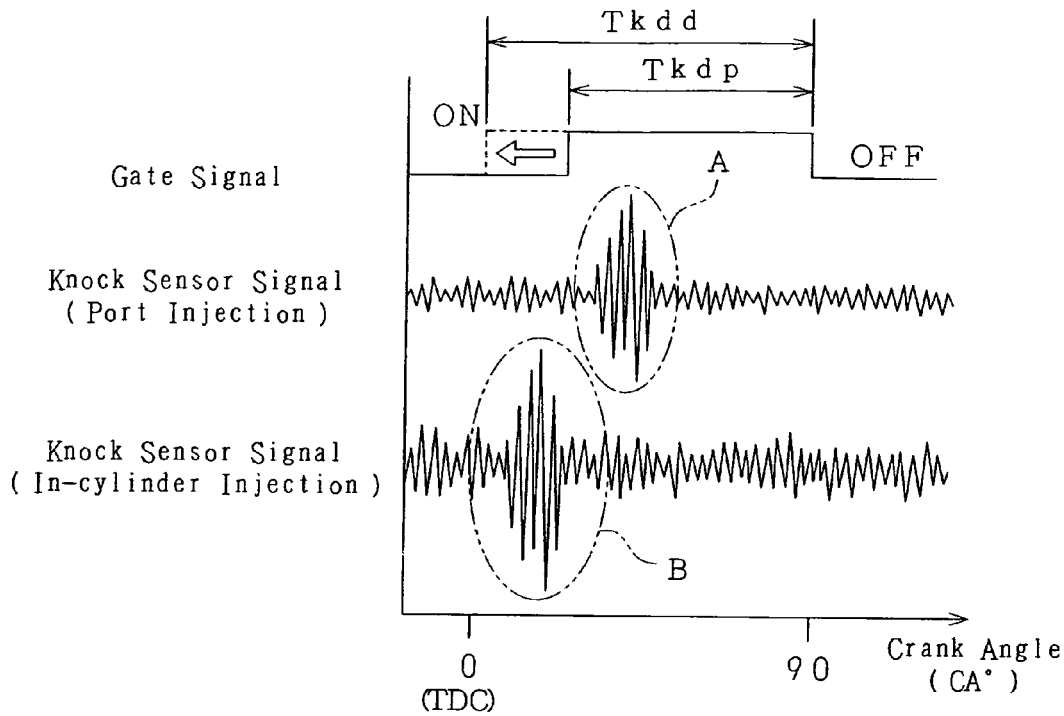
FIG. 8 is a time chart showing the mode for setting a knock determination period.

FIG. 8 illustrates the setting of a knock determination period in the first embodiment. In FIG. 8, the output signals from the knock sensor (knock sensor signals) indicated by ovals A and B represent the output signals (knocking signals) detected by the knock sensor when knocking has occurred. The activation period of the gate signal corresponds to the knock determination period.

As shown in FIG. 8, when the port injection mode is performed, a first knock determination period Tkdp corresponding to this injection mode is set by referring to the first determination period setting map. Therefore, if knocking has occurred when performing port injection, a corresponding knocking signal is detected within the knock determination period, and it can be determined by the knock determination process that knocking has occurred.

As shown by oval B in FIG. 8, when the combined port and in-cylinder injection mode or in-cylinder injection mode is performed, that is, when at least in-cylinder injection is performed, the knocking occurrence timing is advanced in comparison to when the port injection mode is performed. Therefore, if knock determination is performed in the first knock determination period Tkdp during the in-cylinder injection mode, knocking may occur earlier than when the first knock determination period Tkdp starts. If this happens, the knock determination process may erroneously determine that no knocking has occurred even though knocking has actually occurred.

In order to solve this problem, the knock determination period setting process in the first embodiment alters the activation timing of the gate signal in the knock determination period during the port injection mode. That is, the starting point of the first knock determination period Tkdp is changed based on the in-cylinder injection ratio Rd, and the altered knock determination period is set as a second knock determination period Tkdd. More specifically, as the in-cylinder injection ratio Rd increases, the activation timing of the gate signal is altered to an earlier timing, that is, to a timing corresponding to the advanced angle side, as shown by the broken line in FIG. 8. In this manner, the knock determination period is set variably in accordance with the change in the knock initiation timing. Therefore, if knocking occurs when performing in-cylinder injection, a corresponding knocking signal is detected within the knock determination period. This prevents erroneous determination.

The first embodiment has the advantages described below.

(1) The knock determination period is altered in accordance with the ratio of fuel injected by the intake injector 22 and the in-cylinder injector 17. Therefore, even if the knock occurrence timing varies when the fuel injection ratio changes, the knock determination period is set accordingly. As a result, knocking in an internal combustion engine in which the fuel injection ratios are set variably is optimally detected. Thus, the knocking determination is reliable.

(2) The combustion rate of the air-fuel mixture tends to increase as the amount of fuel directly injected into the combustion chamber increases. As the ratio of the amount of fuel injected by the in-cylinder injector 17 increases, the combustion rate of the air-fuel mixture increases and knocking starts earlier. Therefore, the knock determination period is advanced as the ratio of the amount of fuel injected from the in-cylinder injector 17 increases. In this manner the knock determination period is set in an optimal manner in accordance with the change in the knock initiation timing.

A knocking determination apparatus according to a second embodiment of the present invention will now be described focusing on features differing from the first embodiment.

In the first embodiment, reliability of the knocking determination result is ensured by setting the knock determination period while taking into account the change in the knocking occurrence timing resulting from alteration of the ratio of the amount of fuel injected from the in-cylinder injector 17.

In this case, when the combined port and in-cylinder injection mode or the in-cylinder injection mode is selected as the fuel injection mode, that is, when the fuel injection ratio is varied to perform fuel injection from at least the in-cylinder injector 17, the operation of the in-cylinder injector 17 may generate noise having an adverse effect on knocking determination.

More specifically, in many types of fuel injectors for internal combustion engines, fuel injection is started by exciting an electromagnetic solenoid to separate a nozzle needle from a valve seat and open the valve. Fuel injection is stopped by de-exciting the electromagnetic solenoid so that the nozzle needle engages the valve seat to close the valve.

In such type of injector, when the nozzle needle reaches a maximum lift position or engages the valve seat, that is, immediately after fuel injection is initiated or stopped, the nozzle needle hits the valve seat or a stopper, which restricts the opening and closing range of the valve. This causes vibrations including a knocking (impact) noise. Operational noise resulting from such vibrations may be mixed in the output signal from the knock sensor. In particular, since the in-cylinder injector 17 is located closer to the knock sensor 33 than the intake injector 22, operational noise generated by the open and closing operation of the in-cylinder injector 17 is apt to exert a large influence on the output signal from the knock sensor. As a result, the vibrations generated by the operation of the in-cylinder injector 17 may erroneously be determined as vibrations resulting from knocking. Thus, it may be erroneously determined that knocking has occurred even though knocking has not actually occurred.

In the second embodiment, the following processing is performed when setting the second knock determination period Tkdd (step S520 in FIG. 6) described in the first embodiment. The second knock determination period Tkdd is further altered in accordance with the fuel injection period of the in-cylinder injector 17 such that the noise generated by operation of the in-cylinder injector 17 constantly does not overlap with the output signal from the knock sensor 33. More specifically, the second knock determination period Tkdd is set so that it does not overlap the fuel injection period of the in-cylinder injector 17.

In the second embodiment, the inactivation timing of the gate signal is set such that the second knock determination period Tkdd ends earlier than the start of fuel injection from the in-cylinder injector 17, that is, such that the second knock determination period Tkdd ends at a timing advanced from the timing at which the in-cylinder injector 17 starts fuel injection. The timing at which the in-cylinder injector 17 starts fuel injection is calculated by the process of step S150 in the fuel injection control (FIG. 3) as described above. The inactivation timing of the gate signal is more advanced than the fuel injection start timing. The operational noise is not mixed in the output signal from knock sensor immediately after the fuel injection signal is activated when starting fuel injection and there is a response delay time RTS. The response delay time RTS corresponds to the time until the nozzle needle abuts against the stopper and the time the vibrations generated by the abutment is mixed in the output signal from the knock sensor 33. In such cases, the inactivation timing of the gate signal is retarded from the fuel injection start timing by the response delay time RTS.

Figure 9:
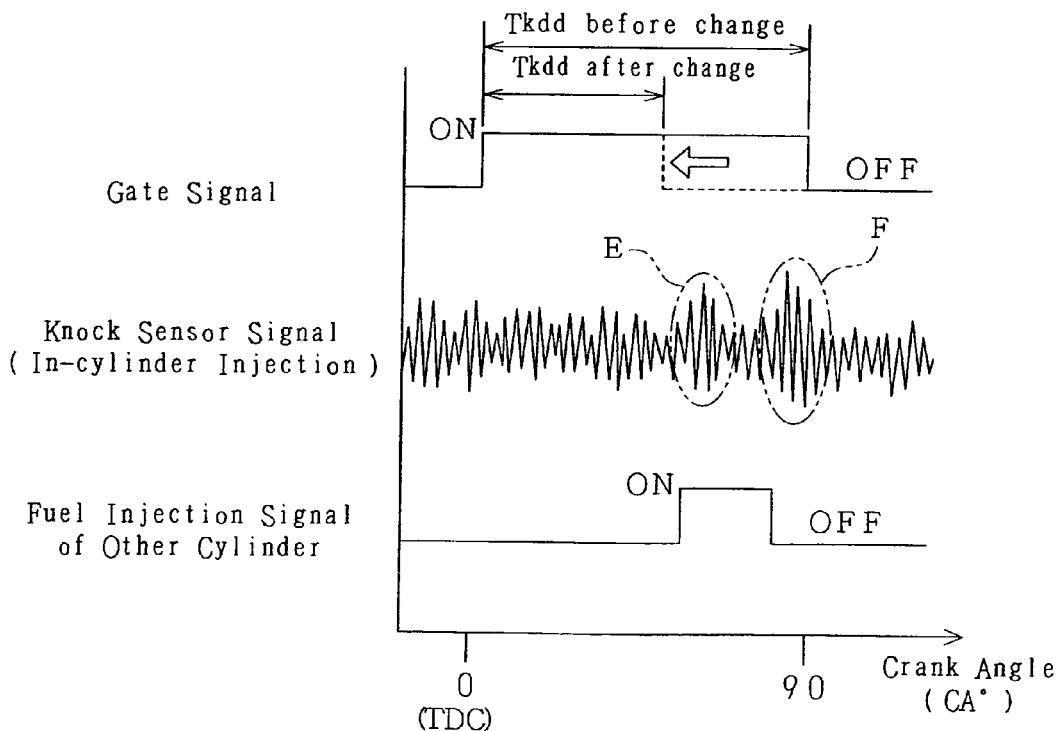
FIG. 9 is a time chart showing the setting for a knock determination period according to a second embodiment of the present invention.

FIG. 9 illustrates the setting of the knock determination period in the second embodiment. The knock sensor output signal indicated by oval E in FIG. 9 includes operational noise generated immediately after fuel injection from the in-cylinder injector 17 is started in cylinder B that differs from cylinder A, which is subject to knocking detection. The knock sensor output signal indicated by oval F in FIG. 9 includes operational noise generated immediately after fuel injection from the in-cylinder injector 17 ends in the other cylinder B.

In the second embodiment, as shown in FIG. 9, the second knock determination period Tkdd is altered such that the second knock determination period Tkdd ends earlier than the start of fuel injection from the in-cylinder injector 17 (indicated by the broken line in FIG. 9). In other words, when fuel is injected by the in-cylinder injector 17, the second knock determination period Tkdd is altered in association with the fuel injection period to avoid the noise generated by the operation of the in-cylinder injector. This minimizes the operational noise of the in-cylinder injector 17 that is mixed in the output signal of the knock sensor 33 during the knock determination period.

Accordingly, the second embodiment further has the following advantage in addition to advantages (1) and (2).

(3) Knocking determination is performed without being affected by noise generated by operation of the in-cylinder injector 17. This prevents erroneous determination caused by vibrations generated by the operation of the in-cylinder injector 17.

Next, a knocking determination apparatus according to a third embodiment of the present invention will be described focusing on the features different from the second embodiment.

Adverse effects resulting from operational noise to the determination of knocking include the following, in addition to those mentioned in the second embodiment. When no operational noise is mixed in the knock sensor output signal, background noise in the output signal is relatively small. If the fuel injection timing of the in-cylinder injector is altered in this state, operational noise may be mixed in a detection signal of the knock sensor. Knock determination is conducted immediately after the fuel injection timing is changed on the premise that the background noise level is small. Therefore, the operational noise present in the detection signal from the knock sensor may be erroneously determined as one caused by knocking until a correct background noise level reflecting the influence by the operational noise of the in-cylinder injector is learned.

In this embodiment, the following process is performed when the second knock determination period Tkdd is set as described in the first embodiment (step S520 in FIG. 6). That is, the second knock determination period Tkdd is further altered in accordance with the fuel injection period from the in-cylinder injector 17 such that noise generated by the opening and closing operation of the in-cylinder injector 17 constantly overlaps the output signal from the knock sensor 33 during the second knock determination period Tkdd. In other words, the determination period alteration means sets the second knock determination period Tkdd such that the entire period of fuel injection from the in-cylinder injector 17 overlaps with at least part of the second knock determination period Tkdd.

In the present embodiment, the inactivation timing of the gate signal is set such that the second knock determination period Tkdd ends later than the end of fuel injection from the in-cylinder injector 17, that is, such that the second knock determination period Tkdd ends at a timing more retarded than the timing when the in-cylinder injector 17 stops fuel injection. The timing when the in-cylinder injector 17 stops fuel injection is calculated based on the fuel injection timing and injection period obtained by the process in step S150 in the fuel injection control described above (FIG. 3). The inactivation timing of the gate signal retarded from the calculated fuel injection ending. Operational noise is not mixed in the output signal from the knock sensor immediately after the fuel injection signal is inactivated at the end of the fuel injection. Often, there is a response delay time RTF. The response delay time RTF corresponds to the time until the nozzle needle is engaged with the valve seat, and vibrations generated by the engagement are mixed in the output signal from the knock sensor 33. In such a case, the inactivation timing of the gate signal is retarded from the fuel injection end timing by the response delay time RTF.

Figure 10:
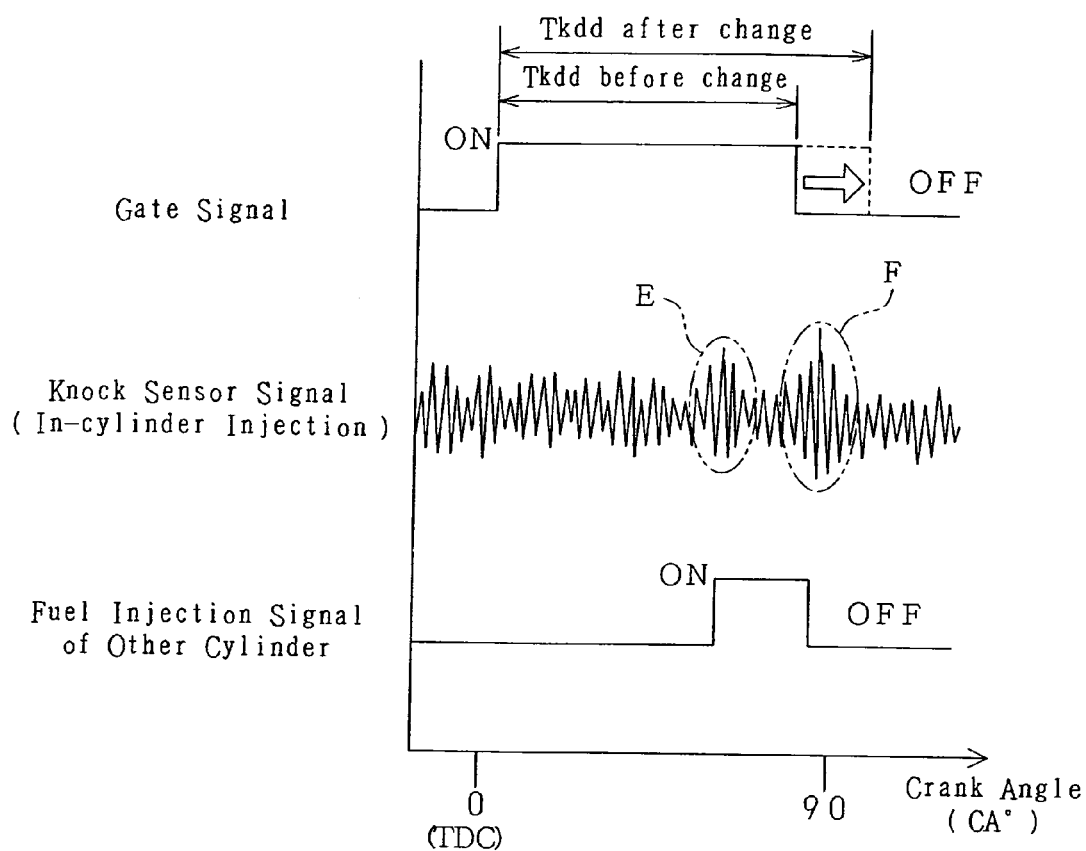
FIG. 10 is a time chart showing the setting for a knock determination period according to a third embodiment of the present invention.

FIG. 10 illustrates the setting of the knock determination period in the present embodiment. The knock sensor output signal indicated by oval E in FIG. 10 shows operational noise mixed immediately after fuel injection starts from the in-cylinder injector 17 in a cylinder B differing from cylinder A, which is subject to knocking detection. The knock sensor output signal indicated by oval F in FIG. 10 shows operational noise mixed immediately after fuel injection from the in-cylinder injector 17 ends in the other cylinder B.

In the present embodiment, as shown in FIG. 10, the second knock determination period Tkdd is altered such that the second knock determination period Tkdd ends later than the end of fuel injection from the in-cylinder injector 17 (as indicated by the broken line in FIG. 10). In other words, when fuel is injected from the in-cylinder injector 17, the second knock determination period Tkdd is altered in association with the fuel injection period such that noise generated by the operation of the in-cylinder injector is always mixed in the output signal from the knock sensor 33 during the knock determination period. Thus, the update of the distribution median value Vm and the standard deviation value SGM, that is, the learning of the background noise level is constantly performed optimally to reflect the influence of the operational noise. As a result, change in the background noise immediately after the alteration of the fuel injection timing is suppressed, the knock determination level Vkd is set at an optimal value reflecting the influence of the operational noise.

In this manner, even if operational noise of the in-cylinder injector 17 is mixed in the knock sensor output signal during the knock determination period, the operational noise is prevented from being erroneously determined as vibrations caused by knocking.

Thus, the third embodiment has the following advantage in addition to advantages (1) and (2).

(4) The knock determination is not affected by the noise generated by operation of the in-cylinder injector 17. This prevents erroneous determination that would be caused by vibrations generated by the operation of the in-cylinder injector 17.

Next, a knocking determination apparatus according to a fourth embodiment of the present invention will be described focusing on the different features from the first embodiment.

In the first embodiment, reliability of the knocking determination result is ensured by setting the knock determination period while taking into account the change in the knock initiation timing caused by alteration of the ratio of fuel injected by the in-cylinder injector 17.

Apart from this, as the combustion rate increases by altering the ratio of fuel injected from in-cylinder injector 17, the vibrations generated along with the combustion of the air-fuel mixture is also increased and the engine vibration is increased. Therefore, the level of background noise detected by the knock sensor 33, that is, the level of the output signal (hereafter referred to as "output level") from the knock sensor 33 when no knocking has occurred tends to become higher. Further, if the background noise level increases, the output level from the knock sensor 33 when knocking has occurred also increases accordingly. This may reduce the reliability of the knocking determination result.

The present fourth embodiment differs from the first embodiment in that not only the knock determination period but also the knock determination level Vkd is altered based on the ratio of fuel injected by the in-cylinder injector 17.

The process of altering the knock determination level Vkd will now be described, referring to FIG. 11. This process is performed as part of the process in step S450 in the knock determination process described in the first embodiment (FIG. 4). Further, this process may be referred to as a knock determination level altering process. The electronic control unit 30 functions as a knock determination level altering means.

Upon starting this process, it is first determined whether or not the current engine operating condition corresponds to the port injection mode shown in FIG. 2, that is, whether or not fuel is injected only from the intake injector 22 (step S600). If it is determined that the engine operating condition corresponds to the port injection mode (YES in step S600), a first knock determination level Vkdp is set (step S610). The first knock determination level Vkdp is obtained from the following expression (9) based on the above-mentioned distribution median value Vm, the standard deviation value SGM, and value u.

$$Vkdp = Vm + u \times SGM \quad (9)$$

The value u is a value that is variably set based on the engine speed NE or the like. Thus, the first knock determination level Vkdp is set to a value that enables appropriate determination of occurrence of knocking when performing the port detection mode.

If it is determined that the current engine operating condition does not correspond to the port injection mode (NO in step S600), the current engine operating condition corresponds to either the combined port and in-cylinder injection mode or the in-cylinder injection mode, and the fuel injection mode is in the state where fuel is injected by the in-cylinder injector 17.

As the amount of fuel directly injected into the combustion chamber 16 increases, the combustion rate of the air-fuel mixture tends to increase. Therefore, as the ratio of fuel injected by the in-cylinder injector 17 increases, the combustion rate of the air-fuel mixture becomes higher, and the output level from the knock sensor 33 increases as described above.

Accordingly, if the determination of step S600 is negative, a second knock determination level Vkdd is set based on the in-cylinder injection ratio Rd (step S620). The second knock determination level Vkdd is set by correcting the first knock determination level Vkdp obtained from expression (9) in accordance with the in-cylinder injection ratio Rd. More specifically, the in-cylinder injection ratio Rd is calculated using the following expression (10) based on the first knock determination level Vkdp and the correction value α.

$$Vkdd = Vkdp + \alpha \qquad (10)$$

Figure 12:
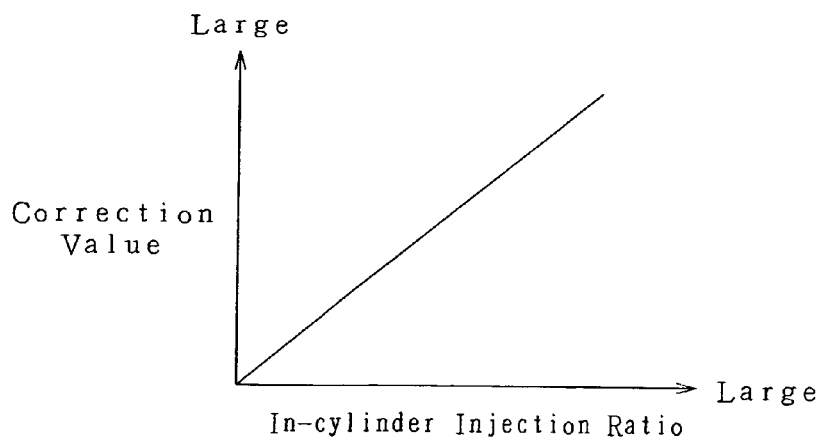
FIG. 12 is a graph showing the relationship between an in-cylinder injection ratio and a correction amounts.

As apparent from FIG. 12, the correction value α is set to a larger value as the in-cylinder injection ratio Rd increases. As a result, the second knock determination level Vkdd is increased as the in-cylinder injection ratio Rd increases.

The ignition timing is retarded if occurrence of knocking is detected. However, this lowers as the engine output becomes lower. Therefore, in order to ensure sufficient engine output, it is more advantageous to determine that no knocking has occurred if the level of knocking is low. For this reason, the first knock determination level Vkdp and the second knock determination level Vkdd are set to be as large as possible.

In this manner, the knock determination level is altered in accordance with changes in the output level of the knock sensor 33 depend on the various fuel injection modes.

Figure 13:
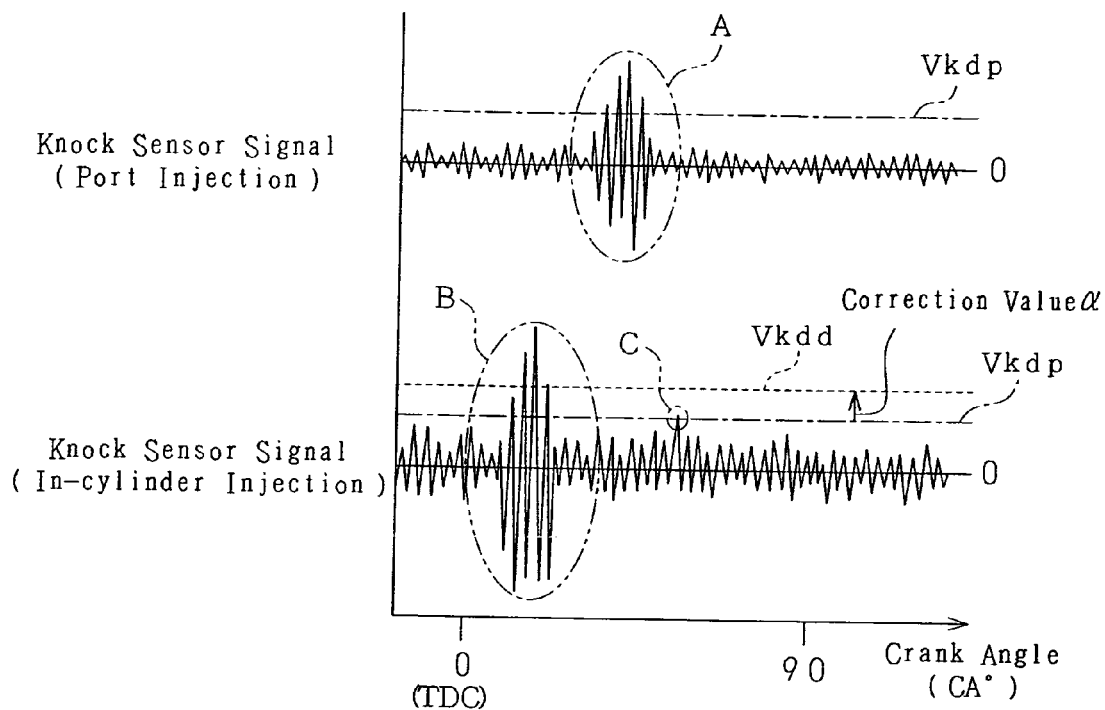
FIG. 13 is a time chart showing the setting for a knock determination level.

FIG. 13 illustrates the setting of the knock determination level in the present embodiment. In FIG. 13, the output signals from the knock sensor 33 indicated by ovals A and B represent output signals detected by the knock sensor 33 when knocking has occurred (knocking signals).

Figure 4:
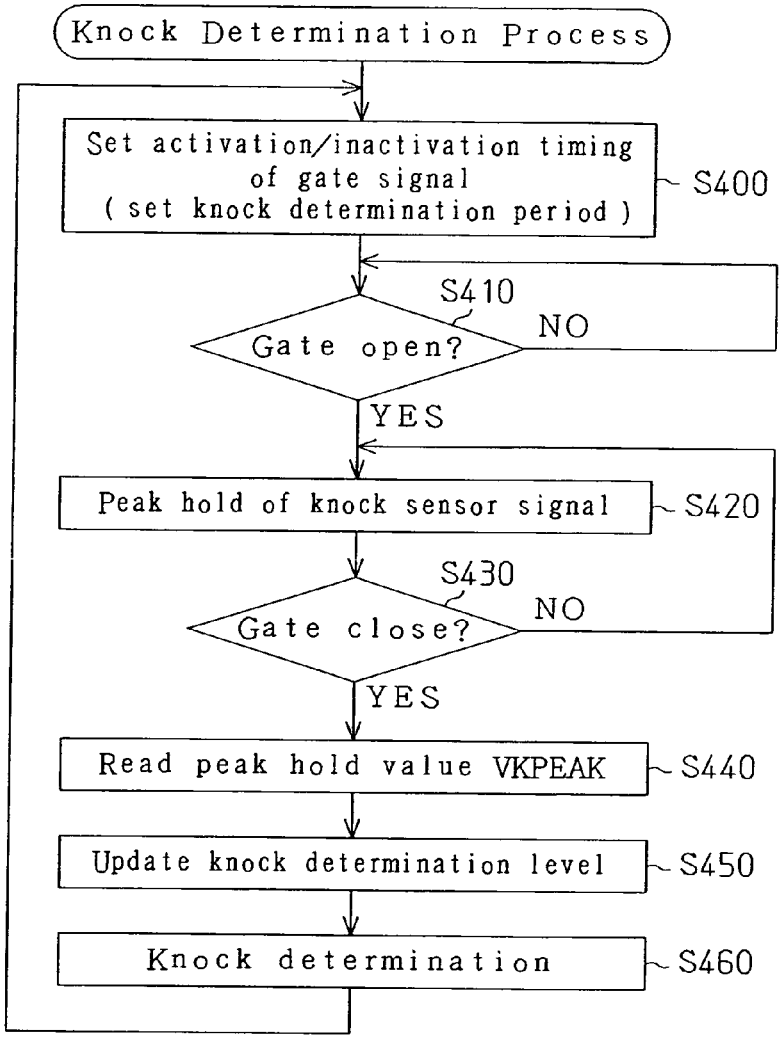
FIG. 4 is a flowchart showing a knock determination process.

As shown in FIG. 13, when port injection is performed, a first knock determination level Vkdp is set according to the fuel injection mode, and determination is made whether or not knocking has occurred through the knock determination process of step S460 described in the first embodiment (FIG. 4).

In contrast, when the combined port and in-cylinder injection mode or the in-cylinder injection mode is performed, that is, when at least the in-cylinder injection is performed, the level of the knocking signal or background noise may become higher in comparison with when the port injection mode is performed. Therefore, if knock determination is performed using the first knock determination level Vkdp during the in-cylinder injection mode, the following problem may occur.

If the background noise level exceeds the first knock determination level Vkdp as indicated by oval C in FIG. 13, the knock determination process may erroneously determine that knocking has occurred even though no knocking has actually occurred.

Further, an increase in the level of the background noise increases the level of the knocking signal. Thus, a knocking signal of a rather high level is output even if the knocking level is low. Therefore, if the level of the knocking signal generated under such circumstances exceeds the first knock determination level Vkdp as shown by oval B in FIG. 13, it may be determined that knocking has occurred even though knocking of a high level has not occurred. This may reduced the engine output due to retardation of the ignition timing.

To solve this problem, in the present embodiment, the knock determination level altering process variably sets the knock determination level based on the in-cylinder injection ratio Rd. The second knock determination level Vkdd is set to a larger value as the in-cylinder injection ratio Rd increases as shown by the broken line in FIG. 13. In other words, the second knock determination level Vkdd is set in accordance with the change in the output level of the knock sensor 33. This prevents erroneous determination of knocking occurrence of knocking. For example, erroneous determination due to background noise being detected as a knocking signal or low level knocking being determined as knocking is prevented.

As described above, the present embodiment has the advantages described below in addition to advantages (1) and (2).

(5) The knock determination level is altered based on the ratio between fuel injected by the intake injector 22 and fuel injected by the in-cylinder injector 17. Therefore, even if the output signal level from the knock sensor 33 is varied when the fuel injection ratio is altered, the knock determination level is set accordingly. As a result, the occurrence of knocking is optimally detected in an internal combustion engine that variably sets the fuel injection ratio. This ensures the reliability of the knocking determination result.

(6) As the amount of fuel directly injected into the combustion chamber increases, the combustion rate of the air-fuel mixture tends to become higher. Therefore, as the ratio of fuel injected by the in-cylinder injector 17 increases, the combustion rate of the air-fuel mixture tends to increase and the output signal level from the knock sensor 33 tends to become higher. When altering the knock determination level based on the fuel injection ratio, the second knock determination level Vkdd is increased as the ratio of fuel injected by the in-cylinder injector 17 increases. As a result, the knock determination level is set optimally in correspondence with change in the output signal level from the knock sensor 33.

Next, a knocking determination apparatus according to a fifth embodiment of the present invention will be described focusing on the different features from the fourth embodiment.

In the fourth embodiment, the reliability of the knocking determination result is ensured by setting the knock determination period while taking into account the change in the knock initiation timing caused by alteration of the ratio of fuel injected by the in-cylinder injector 17.

As described above, when the in-cylinder injector 17 is opened and closed, noise generated by such operation may be mixed in the output signal from the knock sensor 33. Therefore, vibrations generated by the opening and closing of the in-cylinder injector 17 may be erroneously determined as being caused by knocking. This would result in erroneous determination that knocking has occurred even though knocking has not actually occurred.

Figure 11:
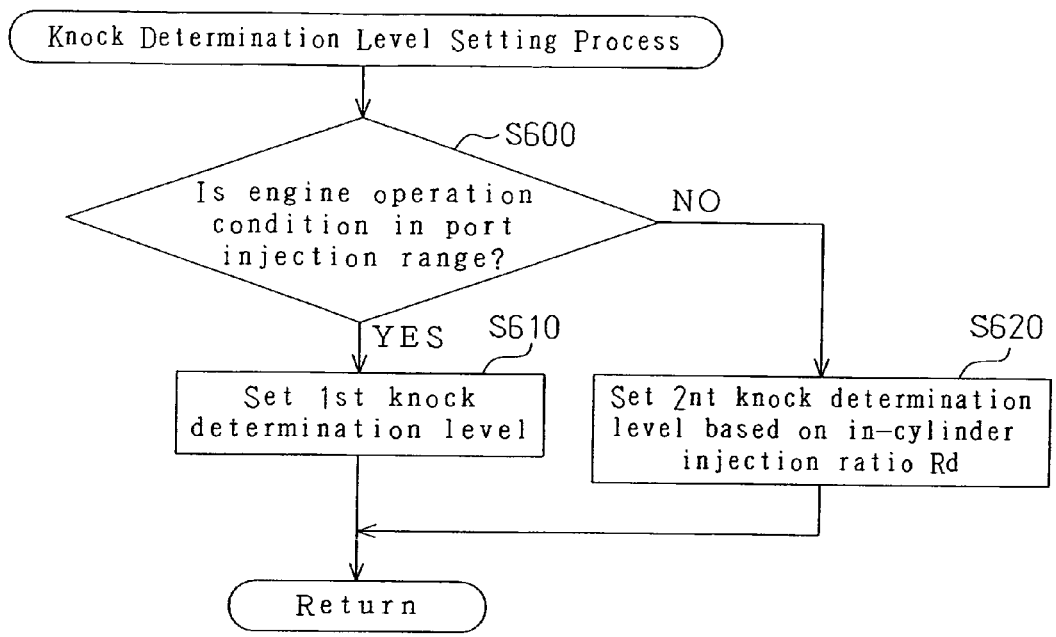
FIG. 11 is a flowchart showing a process for setting a knock determination period according to a fourth embodiment of the present invention.

To solve this problem, in the present fifth embodiment, a second knock determination level Vkdd' is set to exceed the level of noise generated by operation of the in-cylinder injector 17 when the knock determination level for the in-cylinder injection is set as described in the fourth embodiment (step S620 in FIG. 11).

More specifically, as shown FIG. 12, a minimum value αMIN is set for the correction value α that is set based on the in-cylinder injection ratio R so that the correction value α is not set to a value less than the minimum value αMIN. The minimum value αMIN is set to an optimal value that is predetermined through experiments or the like such that the second knock determination level Vkdd' is set to a value that is larger than the level of the operational noise, which is generated by operation of the in-cylinder injector 17, by a predetermined amount. The operational noise level varies in accordance with the pressure of fuel supplied to the in-cylinder injector 17 and tends to become higher as the fuel pressure increases. Therefore, the minimum value αMIN may be variably set based on the fuel pressure.

Figure 14:
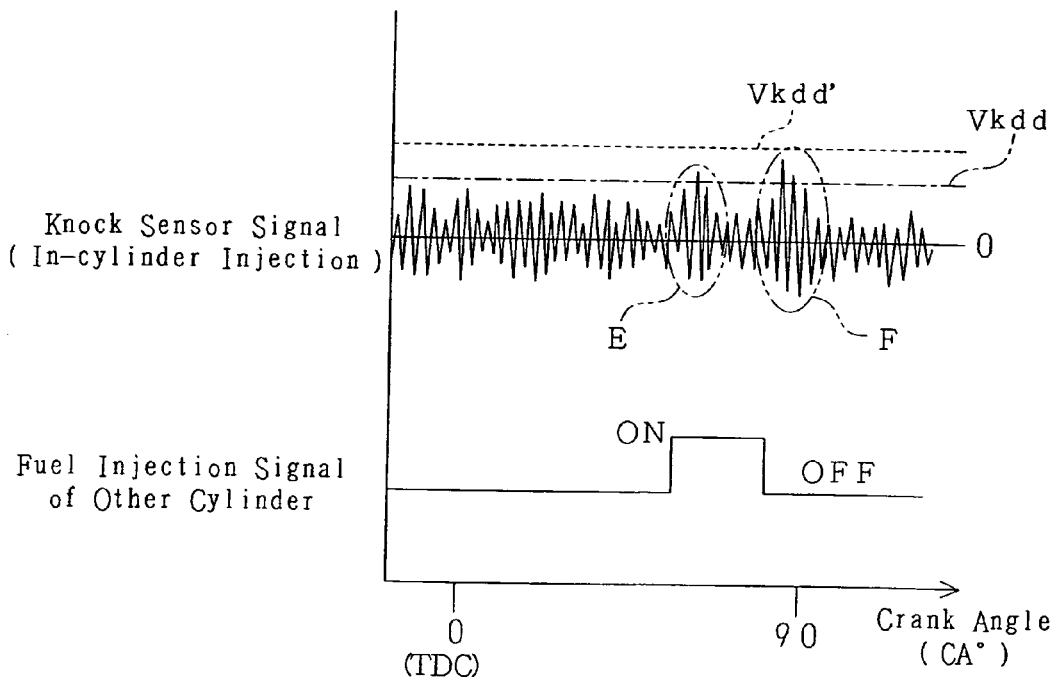
FIG. 14 is a time chart showing the setting for a knock determination level according to a fifth embodiment of the present invention.

FIG. 14 illustrates the setting of the second knock determination level Vkdd' in the present embodiment. The knock sensor output signal indicated by oval E in FIG. 14 shows operational noise included immediately after fuel injection from the in-cylinder injector 17 is started in a cylinder B other than in cylinder A, which is subject to knocking detection. The knock sensor output signal indicated by oval F in FIG. 14 shows operational noise included immediately after the fuel injection ends in the in-cylinder injector 17 of cylinder B.

As apparent from FIG. 14, if the second knock determination level Vkdd is set based on the in-cylinder injection ratio Rd without taking into account the operational noise, the level of the operational noise may exceed the second knock determination level Vkdd as shown in ovals E and F in FIG. 14. This would result in the knock determination process erroneously determining that knocking has occurred even though no knocking has actually occurred.

In the present embodiment, the second knock determination level Vkdd' is set to exceed the operational noise level as shown by the broken line in FIG. 14. Therefore, even if noise is generated by operation of the in-cylinder injector 17, the level of this operational noise does not exceed the second knock determination level Vkdd'. Hence, erroneous determination of knocking is prevented.

As described above, the present embodiment has the following advantage in addition to advantages (1), (2), (5), and (6).

(7) Determination of knocking is not affected by the noise generated by the operation of the in-cylinder injector 17. This prevents erroneous determination caused by vibrations that are generated by the operation of the in-cylinder injector 17.

It should be apparent to those skilled in the art that the present invention may be embodied in many other specific forms without departing from the spirit or scope of the invention. Particularly, it should be understood that the present invention may be embodied in the following forms.

As described above, since the temperature of the air-fuel mixture is lowered due to latent heat of vaporization when fuel is injected by the in-cylinder injector 17, occurrence of knocking is also suppressed. Therefore, if the ignition timing is further advanced, the ignition timing at the limit where knocking occurs, namely the knock limit will be further advanced. Therefore, if the final ignition timing AOP is set to a further advanced value as the in-cylinder injection ratio Rd increases, the engine output is optimally output. For example, this may be achieved as described below in (a) and (b).

(a) The basic ignition timing ABASE is set to a value that is further advanced as the in-cylinder injection ratio Rd increases.

(b) The maximum retardation amount AKMAX is altered to a smaller value as the in-cylinder injection ratio Rd increases.

As long as the basic ignition timing ABASE and the maximum retardation amount AKMAX are set in accordance with the change in the knock limit, basically, the same value may be used for the knocking learned amount AGKNK even if the in-cylinder injection ratio Rd varies. If the same value of the knocking learned amount AGKNK cannot be used for any environmental condition of the internal combustion engine, the knocking learned amount AGKNK may also be altered according to the in-cylinder injection ratio Rd.

An anomaly diagnosis process for detecting an anomaly in the knock sensor 33 may be added to the processes performed by the knocking determination apparatus. For example, it is diagnosed that there is an anomaly in the knock sensor 33 if the output signal from the knock sensor 33 when no knocking has occurred, or the background noise level, exceeds a predetermined fail determination value. In this regard, when fuel is injected by the in-cylinder injector 17, the background noise level tends to become higher due to increase of the combustion rate of the air-fuel mixture. Therefore, the fail determination value is increased as the in-cylinder injection ratio Rd increases in order to avoid erroneous determination in the anomaly diagnosis of the knock sensor 33. Thus, the anomaly diagnosis process is optimally performed.

The fourth and fifth embodiments are based on the first embodiment. However, even when knock determination is performed without setting the knock determination period, occurrence of knocking is optimally detected for an internal combustion engine in which the fuel injection ratio is variable by altering the knock determination level as described in the fourth and fifth embodiments. This ensures the reliability of knock determination results.

The fourth embodiment may be performed in combination with either the second embodiment or the third embodiment. Similarly, the fifth embodiment may be performed in combination with either the second embodiment or the third embodiment.

In the second embodiment, a case in which operational noise is mixed in an output signal from the knock sensor 33 in the last half of the knock determination period is described. If the fuel injection period is set such that operational noise is mixed in an output signal from the knock sensor 33 in the first half of the knock determination period, the knock determination period may be altered to avoid the operational noise in the following manner. Specifically, the activation timing of a gate signal may be set in association with the fuel injection period of the in-cylinder injector 17 such that the second knock determination period Tkdd starts later (i.e., at a further retarded timing) than the timing when fuel injection from the in-cylinder injector 17 ends. In this case, the response delay time RTF is also taken into account when setting the start timing of the second knock determination period Tkdd. This sets a further optimal period.

In the third embodiment, a case in which operational noise is mixed in an output signal from the knock sensor 33 in the last half of the knock determination period is described. If the fuel injection period is set such that operational noise is mixed in an output signal from the knock sensor 33 in the first half of the knock determination period, the knock determination period may be altered as follows such that the operational noise is always mixed in an output signal from the knock sensor 33 during the knock determination period. The activation timing of a gate signal may be set in association with the fuel injection period of the in-cylinder injector 17 such that the second knock determination period Tkdd starts earlier (i.e., at a further advanced timing) than the timing when fuel injection from the in-cylinder injector 17 is started. The response delay time RTS described above is also taken into account so that the start timing of the second knock determination period Tkdd is set at a timing after a predetermined response delay time elapses from when the in-cylinder injector 17 starts fuel injection.

The second knock determination period Tkdd is calculated by modifying the first knock determination period Tkdp. Instead, a second determination period calculation map may be stored in the memory of the electronic control unit 30 so that the second knock determination period Tkdd can be directly calculated based on the in-cylinder injection ratio Rd, the engine speed NE, and the engine load L by referring to the map.

Further, the second knock determination level Vkdd is calculated by modifying the knock determination level Vkdp. However, the value u in expression (9) may be set in accordance with the in-cylinder injection ratio Rd, the engine speed NE and the like, so that the second knock determination level Vkdd is directly calculated using the expression (9).

The present invention is also applicable to an internal combustion engine in which only the port injection mode or the in-cylinder injection mode is performed.

As for the combustion mode in the internal combustion engine 11, stratified combustion may be performed using the in-cylinder injector 17. In this case, the combustion rate of the air-fuel mixture is further increased. Therefore, the various values set based on the in-cylinder injection ratio Rd may be altered by a larger extent so that the embodiments described above and their modifications can be applicable as a knocking determination apparatus for an internal combustion engine performing stratified combustion.

As described above, the in-cylinder injection ratio Rd and the port injection ratio Rp are altered so that their sum is one. That is, the in-cylinder injection ratio Rd and the port injection ratio Rp are in a negative correlation. Accordingly, in the embodiments described above and their modifications, various values that are set based on the in-cylinder injection ratio Rd may be set based on the port injection ratio Rp.

In the description above, the intake injector 22 is an injector provided in each intake port 22a. However, the intake injector 22 may be an injector arranged in a surge tank that is installed in the intake passage 20. It is only required that the intake injector 22 be an injector for injecting fuel into the intake system of an internal combustion engine.

It should be apparent to those skilled in the art that the present invention may be embodied in many other specific forms without departing from the spirit or scope of the invention. Particularly, it should be understood that the present invention may be embodied in the following forms.

What is claimed is:

1. An apparatus for determining whether or not knocking has occurred in an internal combustion engine, the internal combustion engine including a first injector for directly injecting fuel into a combustion chamber, a second injector for injecting fuel into an intake system, and a knock sensor for detecting information relating to knocking and generating an output signal, the apparatus comprising:
    a knocking determination means for determining whether or not knocking has occurred based on the output signal of the knock sensor during a knock determination period; and
    an altering means for altering the knock determination period in accordance with a ratio between the amount of fuel the first injector injects and the amount of fuel the second injector injects.

2. The apparatus according to claim 1, wherein the altering means advances the timing the knock determination period starts as the ratio of the fuel the first injector injects increases.

3. The apparatus according to claim 1, wherein the altering means alters the knock determination period in accordance with the period that the first injector injects fuel such that noise generated by operation of the first injector does not overlap with the output signal of the knock sensor during the knock determination period.

4. The apparatus according to claim 3, wherein the altering means sets the knock determination period such that the knock determination period does not overlap with the period that the first injector injects fuel.

5. The apparatus according to claim 1, wherein the altering means alters the knock determination period in accordance with the period that the first injector injects fuel such that noise generated by operation of the first injector constantly overlaps with the output signal of the knock sensor during the knock determination period.

6. The apparatus according to claim 5, wherein the altering means sets the knock determination period such that the period that the first injector injects fuel entirely overlaps with at least part of the knock determination period.

7. An apparatus for determining whether or not knocking has occurred in an internal combustion engine, the internal combustion engine including a first injector for directly injecting fuel into a combustion chamber, a second injector for injecting fuel into an intake system, and a knock sensor for detecting information relating to knocking and generating an output signal, the apparatus comprising:
    a knocking determination means for comparing the output signal of the knock sensor with a knock determination level to determine whether or not knocking has occurred; and
    a changing means for changing the knock determination level in accordance with a ratio between the amount of fuel the first injector injects and the amount of fuel the second injector injects.

8. The apparatus according to claim 7, wherein the changing means increases the knock determination level as said ratio increases.

9. The apparatus according to claim 8, wherein the changing means changes the knock determination level such that the knock determination level is greater than a noise level generated by operation of the first injector.

10. An apparatus for determining whether or not knocking has occurred in an internal combustion engine, the internal combustion engine including a first injector for directly injecting fuel into a combustion chamber, a second injector for injecting fuel into an intake system, and a knock sensor for detecting information relating to knocking and generating an output signal, the apparatus comprising:
    a controller for determining whether or not knocking has occurred based on the output signal of the knock sensor during a knock determination period and for altering the knock determination period in accordance with a ratio between the amount of fuel the first injector injects and the amount of fuel the second injector injects.

11. The apparatus according to claim 10, wherein the controller advances the timing the knock determination period starts as the ratio of the fuel the first injector injects increases.

12. The apparatus according to claim 10, wherein the controller alters the knock determination period in accordance with the period that the first injector injects fuel such that noise generated by operation of the first injector does not overlap with the output signal of the knock sensor during the knock determination period.

13. The apparatus according to claim 12, wherein the controller sets the knock determination period such that the knock determination period does not overlap with the period that the first injector injects fuel.

14. The apparatus according to claim 10, wherein the controller alters the knock determination period in accordance with the period that the first injector injects fuel such that noise generated by operation of the first injector constantly overlaps with the output signal of the knock sensor during the knock determination period.

15. The apparatus according to claim 14, wherein the controller sets the knock determination period such that the period that the first injector injects fuel entirely overlaps with at least part of the knock determination period.

16. An apparatus for determining whether or not knocking has occurred in an internal combustion engine, the internal combustion engine including a first injector for directly injecting fuel into a combustion chamber, a second injector for injecting fuel into an intake system, and a knock sensor for detecting information relating to knocking and generating an output signal, the apparatus comprising:
a controller for comparing the output signal of the knock sensor with a knock determination level to determine whether or not knocking has occurred and for changing the knock determination level in accordance with a ratio between the amount of fuel the first injector injects and the amount of fuel the second injector injects.

17. The apparatus according to claim 16, wherein the controller increases the knock determination level as said ratio increases.

18. The apparatus according to claim 17, wherein the controller changes the knock determination level such that the knock determination level is greater than a noise level generated by operation of the first injector.

* * * * *